(12) United States Patent
Sethi et al.

(10) Patent No.: US 10,484,333 B2
(45) Date of Patent: Nov. 19, 2019

(54) METHODS AND SYSTEMS FOR PROVIDING LIMITED DATA CONNECTIVITY

(71) Applicant: Cisco Technology, Inc., San Jose, CA (US)

(72) Inventors: Kabiraj Sethi, Fremont, CA (US);
Shivangi Sharma, Los Gatos, CA (US);
Peter G. Jones, Campbell, CA (US);
Jimit Maheta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 271 days.

(21) Appl. No.: 15/650,913

(22) Filed: Jul. 16, 2017

(65) Prior Publication Data
US 2019/0020626 A1    Jan. 17, 2019

(51) Int. Cl.
| | | |
|---|---|---|
| *H04L 29/06* | (2006.01) | |
| *H04L 12/753* | (2013.01) | |
| *H04L 12/933* | (2013.01) | |
| *H04L 12/931* | (2013.01) | |
| *H04L 12/46* | (2006.01) | |
| *H04L 12/24* | (2006.01) | |
| *H04L 12/26* | (2006.01) | |

(52) U.S. Cl.
CPC .......... *H04L 63/0236* (2013.01); *H04L 45/48* (2013.01); *H04L 49/15* (2013.01); *H04L 49/604* (2013.01); *H04L 12/4641* (2013.01); *H04L 41/02* (2013.01); *H04L 43/10* (2013.01); *H04L 69/03* (2013.01)

(58) Field of Classification Search
None
See application file for complete search history.

(56) References Cited

U.S. PATENT DOCUMENTS

| | | | | |
|---|---|---|---|---|
| 5,579,368 A | * | 11/1996 | van Berkum | H04M 3/323 379/16 |
| 6,327,342 B1 | * | 12/2001 | Mobley | H04M 3/12 379/37 |
| 6,519,324 B1 | * | 2/2003 | Guevara | H04M 3/24 379/265.01 |
| 6,785,272 B1 | * | 8/2004 | Sugihara | H04L 41/0213 370/386 |
| 7,593,320 B1 | * | 9/2009 | Cohen | H04L 41/0663 370/217 |
| 8,681,603 B1 | | 3/2014 | Bishara et al. | |

(Continued)

*Primary Examiner* — Jamaal Henson

(57) ABSTRACT

In one embodiment, a system, apparatus, and method are described for providing limited data connectivity for devices connected to a switch when the switch enters bootloader mode. The switch has a central processing unit (CPU), the CPU comprising a reload handler and an application-specific integrated circuit (ASIC), the ASIC comprising ASIC forwarding logic. The ASIC is instructed, by the reload handler, to store an ASIC database, the ASIC database for storing the ASIC forwarding logic. The reload handler maintains a physical layer (PHY) state of the switch. Use of spanning tree protocol (STP) and Transmission Control Protocol (TCP) keepalive is disabled in the switch. A state of stack hardware is retained in switch memory. New ports of the switch are prevented from becoming active, and the ASIC forwarding logic is, in response to receiving the instruction, stored in the ASIC database. Related systems, apparatuses, and methods are also described.

20 Claims, 7 Drawing Sheets

(56) References Cited

U.S. PATENT DOCUMENTS

| | | | |
|---|---|---|---|
| 8,725,905 B2* | 5/2014 | Terry | H04L 12/10 370/389 |
| 9,128,878 B2* | 9/2015 | Lambert | G06F 11/1417 |
| 9,438,471 B1 | 9/2016 | Amdahl | |
| 2010/0217965 A1* | 8/2010 | Wolff | H04L 12/10 713/2 |
| 2014/0113534 A1* | 4/2014 | Pritchett | B24D 11/02 451/529 |

* cited by examiner

METHODS AND SYSTEMS FOR PROVIDING LIMITED DATA CONNECTIVITY

TECHNICAL FIELD

The present disclosure generally relates to power over Ethernet systems.

BACKGROUND

Persistent power-over-Ethernet (PoE) has solved one of the major problems in connected lighting. Power is delivered during maintenance reload for power critical devices, e.g. ceiling lights. PoE powered devices requiring power persistence are not limited to just lighting devices. However, even with Persistent PoE, during the maintenance reload, the management plane has no control over the PoE devices since there is no end-to-end data connectivity, and thus, no input from the PoE devices.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

Figure 1:
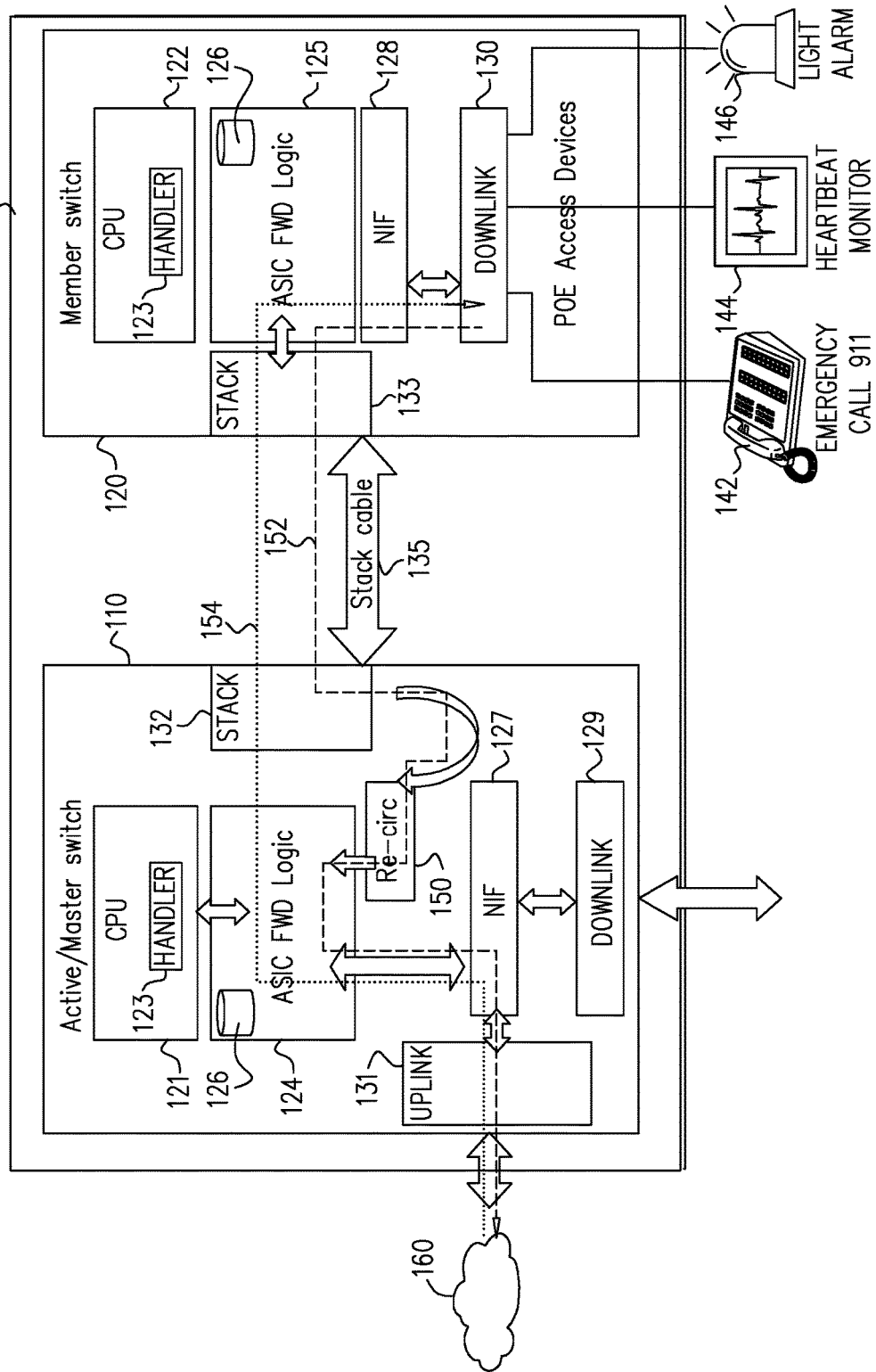
FIG. 1 is a block diagram illustration of a first embodiment, constructed and operative in accordance with an embodiment of the present disclosure.

In one embodiment, a system, apparatus, and method are described for providing limited data connectivity for devices connected to a switch when the switch enters bootloader mode. The switch has a central processing unit (CPU), the CPU comprising a reload handler and an application-specific integrated circuit (ASIC), the ASIC comprising ASIC forwarding logic. The ASIC is instructed, by the reload handler, to store an ASIC database for storing the ASIC forwarding logic. The reload handler maintains a physical layer (PHY) state of the switch. Use of spanning tree protocol (STP) and Transmission Control Protocol (TCP) keepalive is disabled in the switch. A state of stack hardware is retained in switch memory. New ports of the switch are prevented from becoming active, and the ASIC forwarding logic is, in response to receiving the instruction, stored by the ASIC in the ASIC database. Related systems, apparatuses, and methods are also described.

EXEMPLARY EMBODIMENTS

In embodiments described herein, methods of making limited data connectivity available for Power-over-Ethernet (PoE) devices and non-PoE devices during planned and unplanned system outage of various embodiments of stackable, modular chassis, and stand-alone stitches are described. Switches (such as, but not limited to Cisco switches, or other comparable network switches) typically operate in one of stacked mode or standalone mode, as well as a modular chassis system, and support data forwarding end-to-end for the user devices when switch software has failed. Some embodiments described herein, either separately or in combination, define a method of maintaining persistent network connectivity when main software is not active or has failed, e.g., during a switch maintenance reload. Thus, if an entire full stack or chassis software networking system has failed, limited network connectivity can still be provided, as will be described below.

By way of example, the ability to make an emergency phone call using PoE telephone devices during system failure may be provided. Other exemplary embodiments may involve supporting critical medical monitoring systems (e.g., heart monitoring system) and building alarm systems, in order to ensure that these systems maintain limited data connectivity during switch down time.

By way of introduction, when a switch undergoes a reload, a crash or malfunction, a software or firmware upgrade, or is only minimally operational for some reason for a period of time, the switch will, as described below, enter "auto-pilot" mode. In such a case, switch hardware maintains a data plane with a previous known configuration and forwarding configuration. Accordingly, minimal disruption occurs during a transition to a new software or during a crash scenario.

The switch may comprise a stackable switch, a standalone switch, a modular switch, a modular switch with one or more supervisory modules, an enterprise switch, or other switch configurations known in the art. A reload handler, running in a central processing unit (CPU) of the switch performs, at least, the following, in order to keep the switch in "auto-pilot", and provide connectivity to PoE devices already connected to the switch:

- A database resident in an application-specific integrated circuit (ASIC) disposed in the switch is retained. The database maintains the ASIC forwarding logic, so that packets are forwarded properly from their ingress into the switch to their egress from the switch.
- A physical layer (PHY, typically a dedicated chip), is retained. That is to say the electrical and physical connections are maintained, ensuring transmission and reception of raw bit streams, between devices connected to the switch to an outbound port from the switch.
- An implementation of spanning tree protocol (STP) is disabled in the switch.
- Use of Transmission Control Protocol (TCP) keepalive is disabled in the switch.
- A state of stack hardware and software in the switch is retained in memory by the switch.
- No new ports may be added to or activated in the switch.

The above are referred to below as "minimal operation of the reload handler".

In ordinary operation, the switch typically forwards packets via the ASIC disposed in the switch. This pathway through the ASIC may be referred to as a "fast pathway". When the switch is in "auto-pilot" mode, the pathway is via the switch CPU and not via the ASIC. This pathway may be referred to as slow-path forwarding, or minimum slow-path forwarding.

Reference is now made to FIG. 1, which is a block diagram illustration of a first embodiment constructed and operative in accordance with an embodiment of the present disclosure. FIG. 1 depicts a member reload scenario for a partial stack down scenario in a stackable or modular chassis switch, such as stackable switch 100. The system of FIG. 1 comprises at least two switches (which will be described below) which are stacked together in a stackable switch 100. A first switch, which functions as master switch 110, as is known in the art, manages the stackable switch 100, and serves as a control center for the stackable switch 100. Typical management tasks include fault detection, virtual local area network (vLAN) creation and modification, security, and quality of service (QoS) controls. The stackable switch 100 has only one configuration file, which is distributed to each member switch in the stackable switch 100. In some embodiments, by way of a non-limiting example, there may be up to nine switches (i.e. the master switch, and eight member switches) in the stackable switch 100. This allows each switch in the stackable switch 100 to share the same network topology, media access control (MAC) address, and routing information. In addition, it allows for any member switch in the stackable switch 100 to become the master switch 110, if the master switch 110 ever fails.

A second switch, member switch 120, which is a member, i.e., a non-master, switch of the stackable switch 100 is also comprised in the system of FIG. 1. As noted above, there may be other member switches.

The master switch 110 and the member switch 120 comprise a central processing unit (CPU) 121, 122, respectively, which provide an execution platform for executing machine readable instructions such as software. The CPU 121, 122 comprises dedicated hardware logic circuits, in the form of an application-specific integrated circuit (ASIC), field programmable gate array (FPGA), or full-custom integrated circuit, or a combination of such devices. Alternatively or additionally, some or all of the functions of the CPU 121, 122 may be carried out by a programmable processor microprocessor or digital signal processor (DSP).

The CPU 121, 122 comprises a reload handler 123, also called a crash handler, which, as will be explained below in greater detail, is invoked when a member reload command or a slot reload command is used to bring down a particular switch in a data stack, or alternatively, if a member switch (e.g., member switch 120) needs to be reloaded due to a software malfunction. The reload handler 123 is depicted in FIG. 1. However, for ease of depiction, the reload handler 123 is not depicted in figures of other embodiments, although it is understood to be comprised in the CPU described in the other embodiments.

The master switch 110 and the member switch 120 comprise ASIC forwarding logic 124, 125. The ASIC forwarding logic 124, 125 ensures that packets are forwarded properly from connected devices, such as devices 142, 144, 146, through the member switch 120 to the master switch 110 as needed. The ASIC forwarding logic 124, 125 comprises an ASIC database 126, which, as described below, stores forwarding data so that, during a reload, crash, or malfunction, forwarding may be maintained to known addresses. For ease of depiction, the ASIC database 126 is not depicted in figures of other embodiments, although it is understood to be comprised in the ASIC described in the other embodiments.

The master switch 110 and the member switch 120 comprise a network interface function (NIF) 127, 128, which interfaces between the internal hardware and software of the master switch 110 or the member switch 120 and the "outside world", i.e. devices, such as devices 142, 144, 146, or other networking hardware (not depicted) to which the stackable switch 100 may be connected.

The NIF 127, 128 is connected to a downlink 129, 130, through which communications flow to and from those devices 142, 144, 146, or other networking hardware (not depicted for the master switch 110) to which the stackable switch 100 is connected. The NIF 127 of the master switch 110 is also connected to an uplink 131, through which communications flow to a network 160. The network 160 might comprise an internal network, an external cloud, the Internet, or a combination of internal and external networks.

Additionally, the master switch 110 and the member switch 120 comprise hardware and software (indicated as "stack" 132, 133) by which the master switch 110 and the member switch 120 are integrated into the stackable switch 100. A stack cable 135 comprises a physical link by which the master switch 110 and the member switch 120 are physically connected.

Turning to the operation of the system of FIG. 1, if the member switch 120 has gone down and entered bootloader (sometimes referred to as "ROMmon", i.e., ROM monitor) mode, the member switch 120 becomes inoperative. As is known in the art, by way of example, a Cisco or other switch may go into ROMmon mode due to boot failure. When the switch enters ROMmon mode, a virtual configuration register setting forces the switch (such as member switch 120) to stop in ROMmon mode during boot-up. Or, alternatively, if a break sequence is sent to a console controlling the switch (such as member switch 120) during boot-up, the switch (such as member switch 120) enters ROMmon mode.

The plurality of devices 142, 144, 146 may be configured to maintain persistent network connections, as well as to maintain persistent PoE power. Such devices may include an Internet Protocol (IP) telephone 142, a PoE heartbeat monitor 144, and a PoE light or alarm 146. It is appreciated that these devices are mentioned by way of example only, and any appropriate PoE device may be connected to the member switch 120. Additionally, it is appreciated that FIG. 1 depicts these PoE devices connected to the member switch 120. As a matter of practice, there may be up to as many connected devices as may be supported by the member switch 120, or, as few as one device may be connected.

In an embodiment, when the member switch 120 enters ROMmon mode, the hardware of the member switch 120 enters "auto-pilot" mode, wherein the hardware maintains a data plane with a previous known configuration and forwarding configuration. Accordingly, minimal disruption occurs during a transition to a new software or during a crash scenario.

A default dynamic destination index (DI) entry is programmed at the time of the crash, reload, or malfunction, as an entry in the ASIC forwarding logic 125 in order to reroute a data-path through the member switch 120 via a stack-ASIC interface (SIF) (included in the stack 132, 133 hardware and software) over the stack cable 135 to the master switch 110. The master switch 110 passes packets received over the SIF from the member switch's 120 egress path to ingress forwarding logic of the master switch 110 using a re-circulation path 150. The recirculation path 150, as its name would suggest, recirculates the packets back to the member switch 120. The path of the packets sent from the plurality of devices 142, 144, 146 to the network 160 is illustrated with a dashed line 152. The return path is shown as a dotted line 154. Recirculating the packets to the member switch 120 ensures that communication continues to the plurality of devices 142, 144, 146 is maintained regardless of the crash, reload, or malfunction.

The master switch 110 makes no changes in how packets received in this manner from the presently down member switch 120, are treated. Accordingly, these packets are forwarded to an appropriate destination switch through the SIF path, depicted as a dotted line in FIG. 1.

However, during this period, the member switch 120 will not establish any new connections, and no new PoE device will be powered by the member switch 120.

By way of a summary of the above discussion, a first, dotted line 154 indicates "normal" path of data packets through the stackable switch 100 (where the dotted line is understood to flow in both directions), and a second, dashed line 152 indicates the upstream path of data packets through the stackable switch 100 when reload handler 123 invokes minimal slow-path forwarding.

Figure 2:
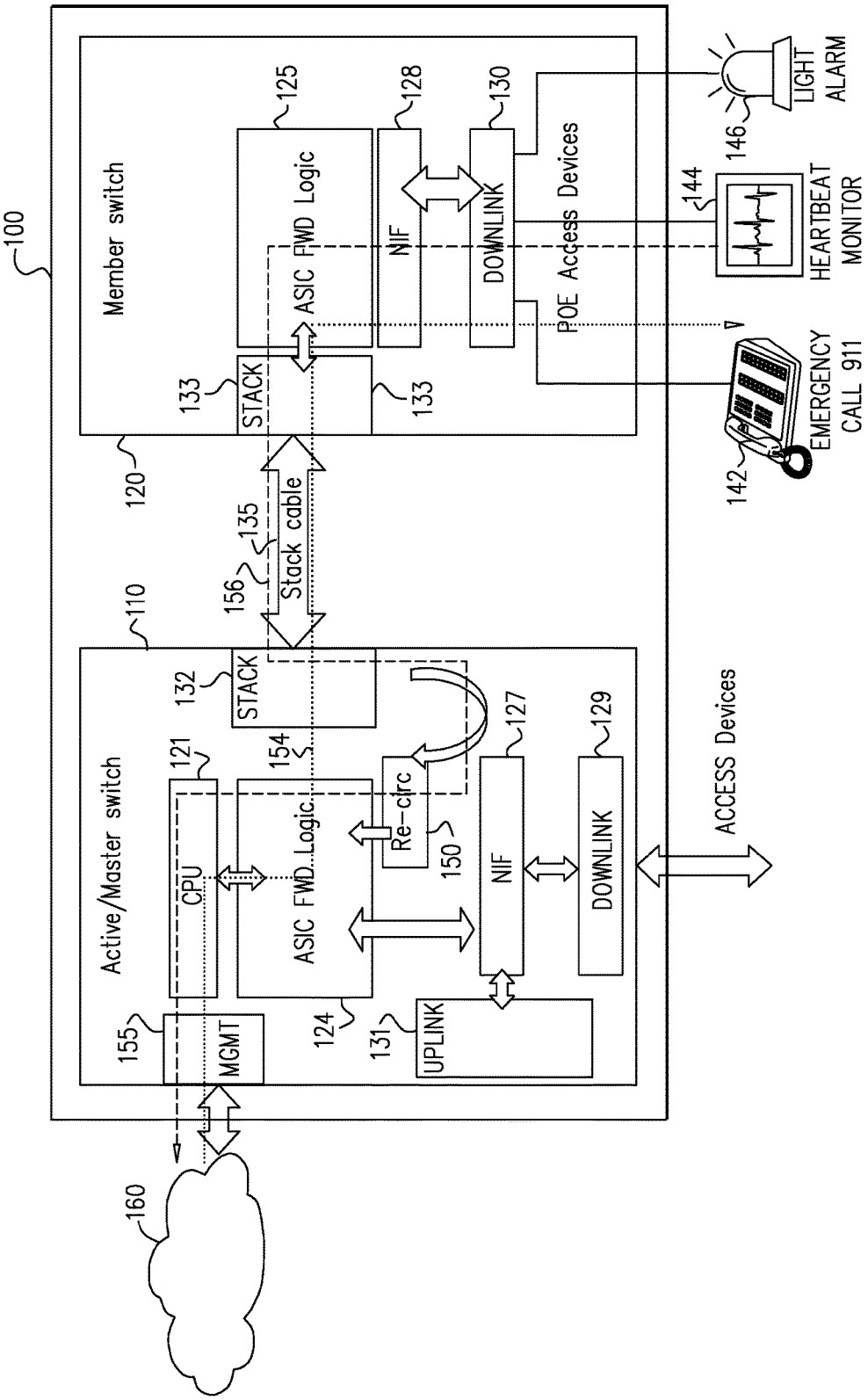
FIG. 2 is a block diagram illustration of a second embodiment, constructed and operative in accordance with an embodiment of the present disclosure.

Reference is now made to FIG. 2, which is a block diagram illustration of a second embodiment, constructed and operative in accordance with an embodiment of the present disclosure. When a complete stack reload occurs, and all members of the stackable switch 100, including the master switch 110 (and any standby master switch (not depicted)), all of the switches in the stackable switch 100 enter ROMmon mode, i.e., they enter boot-loader. This results in all active software in all of the switches in stackable switch 100 being terminated. In such a case, the reload handler 123 performs the following in order to keep the connection to the plurality of devices 142, 144, 146 up and running:

All of the actions mentioned above with reference to FIG. 1 as being performed are also performed on all of the members of the stackable switch 100, including the master switch 110 (and any standby master switch (not depicted)).

The data-path now defaults to a management Ethernet port (MGMT) 155 of the master switch 110 for all look-ups in the ASIC forwarding logic 124, 125 which fail due to the entry into ROMmon mode. Data from any active switch (e.g. member switch 120) is routed to the CPU 121 via a default entry in the ASIC forwarding logic 124, 125.

Forwarding for Layer 2 and Layer 3 of the Open Systems Interconnection model (OSI) model to locations which were known to the stackable switch 100 before the complete stack reload began continues to occur normally.

Packets from the CPU 121 use a data-path which is available to the master switch 110 via the management Ethernet port 155.

Packets which cannot be switched through the ASIC forwarding logic 124, 125 (due to being in ROMmon mode) are then "punted" to the next switching level (i.e., fast switching or process switching) via the CPU (i.e. via the reload handler 123). These punted packets are subjected to a proxy forwarding logic in the boot-loader (not depicted). The proxy forwarding logic modifies Layer 3 addresses from packets which are coming from PoE powered devices ("PD devices") and adds the IP address of the MGMT port address as a source IP. The boot-loader creates and maintains a table of device contexts in form of <MAC, VlanID, srcIP, MgmtIP, TargetedDestIP> for packet modification of forwarding from CPU to MGMT port and CPU to ASIC. The fields in the above mentioned above are as follows:

MAC—the MAC address of the device from which the packets originated.

VlanID—an identifier of the virtual LAN on which the device which the packets originated is located.

srcIP—the source IP address from which the packets originated.

MgmtIP—the IP address of the management port through which the packets were re-forwarded.

TargetDestIP—the IP address to which the packets are to be sent.

Figure 3:
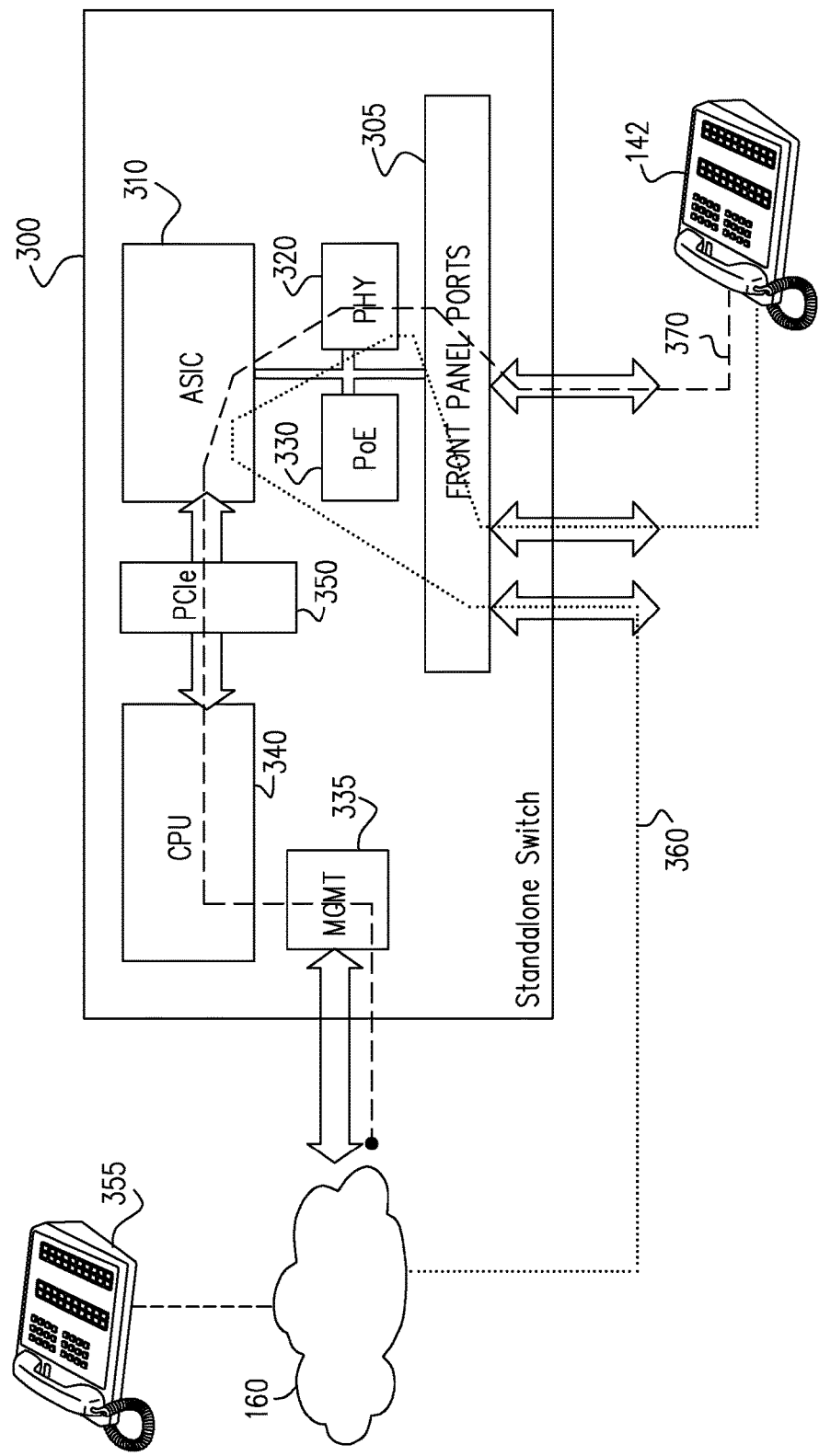
FIG. 3 is a block diagram illustration of a third embodiment, constructed and operative in accordance with an embodiment of the present disclosure.

Reference is now made to FIG. 3, which is a which is a block diagram illustration of a third embodiment, constructed and operative in accordance with an embodiment of the present disclosure. The method and system described herein for providing limited data connectivity can also be provided in some embodiments of standalone switches 300. By way of a non-limiting example, a Cisco Catalyst 3K, WS-3850 (commercially available from Cisco Systems, Inc., 300 East Tasman Drive, San Jose, Calif., 95134, USA), switch may be such a standalone switch 300.

By way of example, the IP phone 142 device is registered on the standalone switch 300, and a Call Manager system (not depicted) and external ports of the IP phone 142 are connected to downlink (i.e., front panel) ports 305 of the standalone switch 300, then minimal operation of the reload handler can be invoked when the standalone switch 300 goes into reload mode (i.e. ROMmon mode). In such a case, the ASIC 310, which in this case may be a Cisco Systems, Inc. ASIC, by way of example, can maintain its state, and can continue forwarding the data and control plane traffic without resetting ASIC state and tables. Accordingly, the reload handler 123 releases CPU 340 resources and maintains the ASIC 310, PHY 320, and PoE controller 330 states unchanged.

The reload handler 123, upon a crash, reload, or malfunction, adds a default entry in the ASIC 310 pointing to the CPU 340 into a management (MGMT) port 335 for persistent data interfaces. A minimal slow-path forwarding module, which is a software module of CPU 340 now starts running in the ROMmon/bootloader. A Peripheral Component Interconnect Express (PCIe) 350, a serial expansion bus standard for connecting a computer to one or more peripheral devices, or other appropriate interface, may serve as an interface between the ASIC 310 and the minimal slow-path forwarding module of CPU 340. It is appreciated that the slow path is only required if there is no direct connectivity from the standalone switch 300 to the call manager from a downlink path (i.e., via downlink ports 305).

All external connectivity from the downlink ports 305 are forwarded through regular ASIC forwarding from previously known MAC and IP addresses. The control path to the MGMT port 335 provides a path to the external network 160, and a downstream IP telephone 355.

The minimal operation of the reload handler is invoked.

By way of a summary of the above discussion, a first, dotted line 360 indicates "normal" path of data packets through the standalone switch 300, and a second, dashed line 370 indicates the path of data packets through the standalone switch 300 when reload handler 123 invokes minimal slow-path forwarding.

Figure 4:
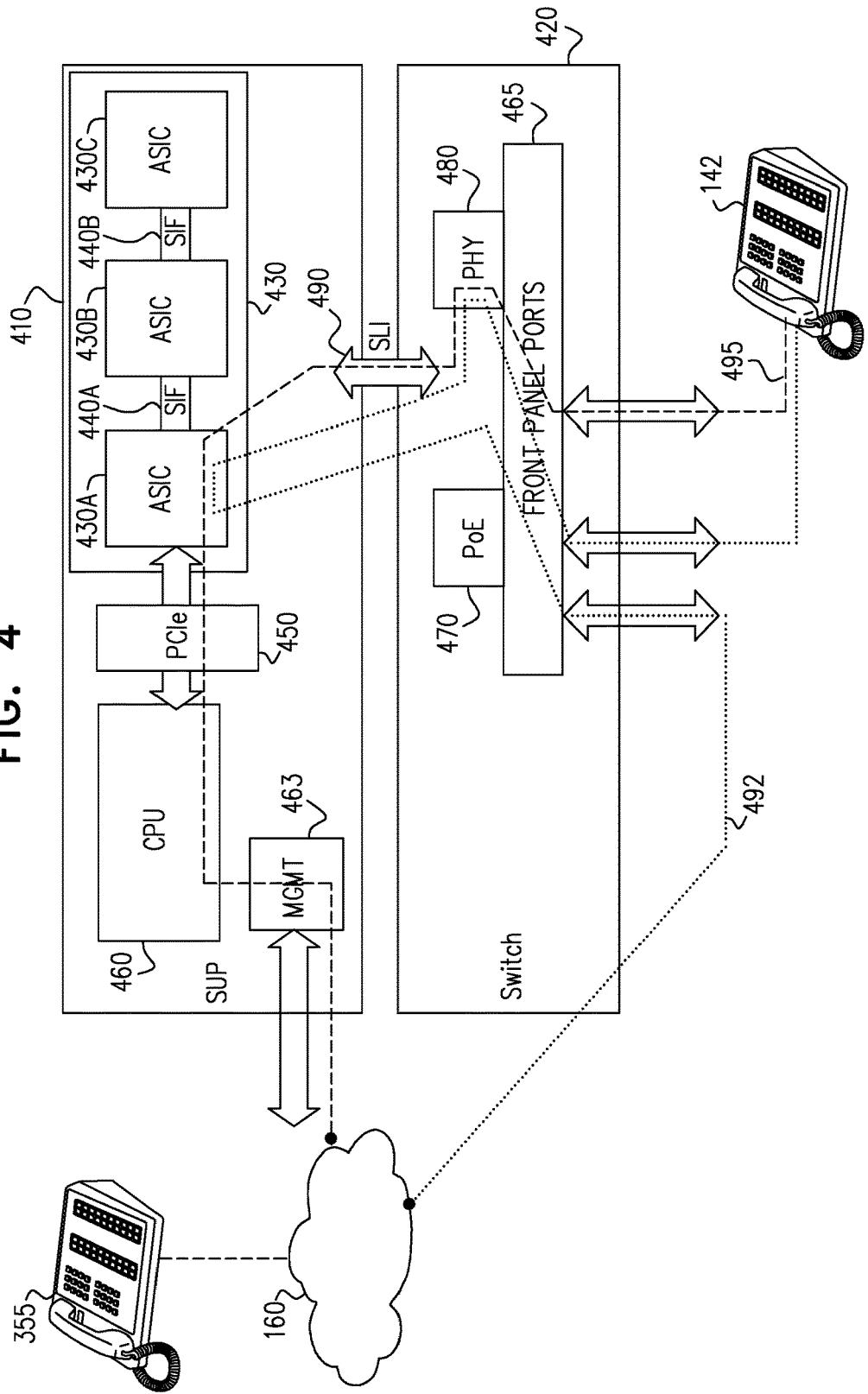
FIG. 4 is a block diagram illustration of a fourth embodiment, constructed and operative in accordance with an embodiment of the present disclosure.

Reference is now made to FIG. 4, which is block diagram illustration of a fourth embodiment, constructed and operative in accordance with an embodiment of the present disclosure. The embodiment depicted in FIG. 4, and described below is similar to the embodiment described above with reference to FIG. 3. A single supervisory module (SUP) 410 is operatively connected to a standalone modular switch 420. As is known in the art, modular switches with supervisory modules are typically designed so that control plane management functions, such as, but not necessarily limited to: Layer 2 and 3 services, redundancy capabilities, configuration management, status monitoring, power and environmental management, and so forth are controlled by the supervisory module 410.

The supervisory module 410 comprises a plurality of ASICs 430 (depicted as comprising ASICs 430A, 430B, 430C interconnected via the SIF 440). The PCIe 450 serves as an interface between the plurality of ASICs 430 and the minimal slow-path forwarding module 460. The minimal slow-path forwarding module 460 is connected to the outside network 160 via the management port 463. A PoE telephone 355 is depicted as the receiving device of packets which are sent through the standalone modular switch 420 to the supervisory module 410, and to the "outside world" via the management port 463 when minimal slow-path forwarding is invoked.

The standalone modular switch 420 is, for the ease of depiction, shown as comprising front panel ports 465, to which is connected the PoE telephone 142. The standalone modular switch 420 comprises a PoE controller 470 and a PHY controller 480, as discussed in earlier embodiments. The standalone modular switch 420 interfaces with the supervisory module 410 using a stack line interface (SLI) 490.

Aside from the minimal operation of the reload handler, when minimal slow-path forwarding is invoked, the SLI 490 is also maintained undisturbed in the presently described embodiment.

By way of a summary of the above discussion of FIG. 4, a dotted line 492 indicates "normal" path of data packets through the standalone modular switch 420 and supervisory module 410. A second, dashed line 495 indicates the path of data packets through the standalone modular switch 420 and supervisory module 410 when reload handler 123 invokes minimal slow-path forwarding.

Figure 5:
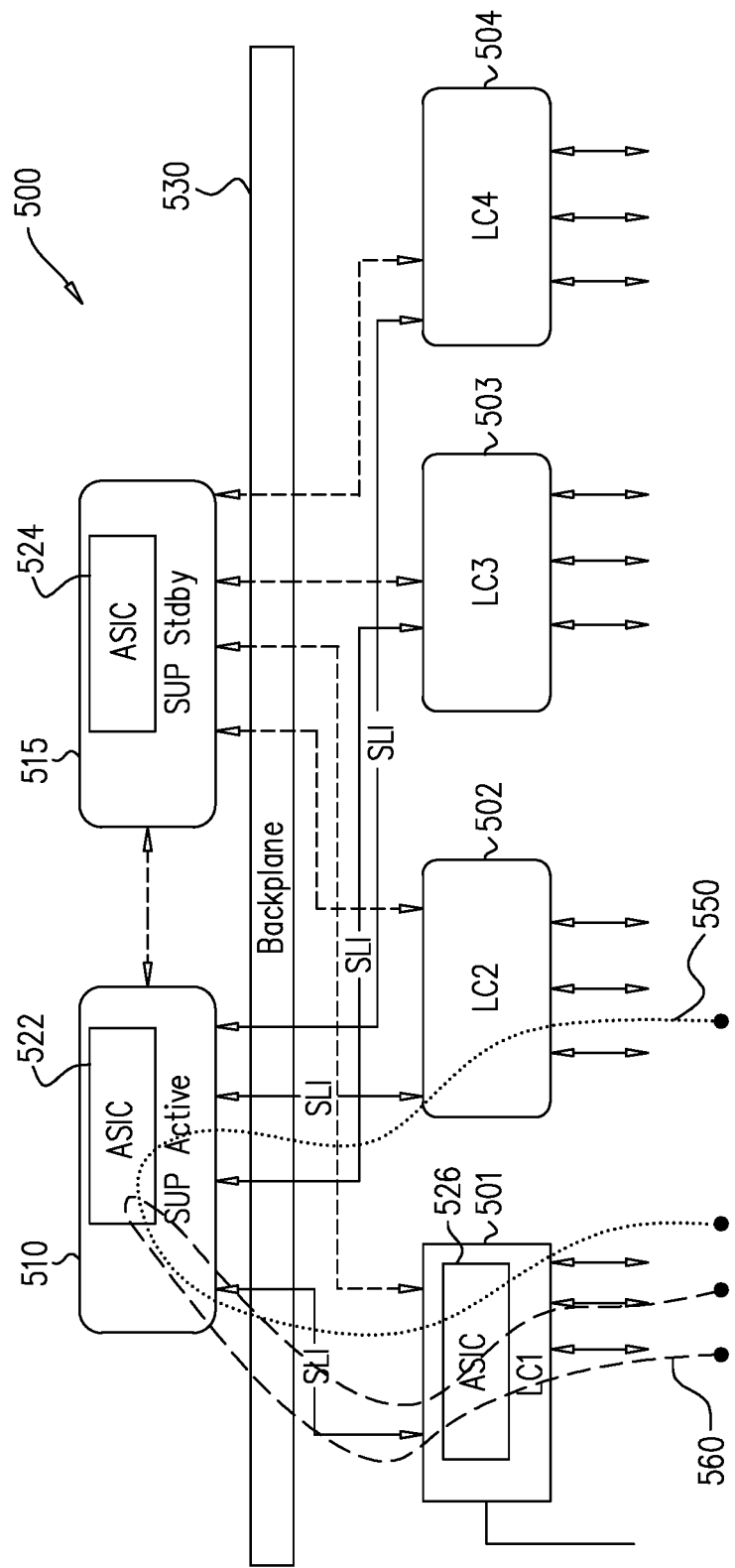
FIG. 5 is a block diagram illustration of a fifth embodiment, constructed and operative in accordance with an embodiment of the present disclosure.

Reference is now made to FIG. 5, which is a block diagram illustration of a fifth embodiment, constructed and operative in accordance with an embodiment of the present disclosure. An enterprise modular switch, such as the modular switch 500, is depicted in a high level manner in FIG. 5. Such switches also offer PoE features. In certain switches, such as modular switch 500, for example, data switching for the line-cards, such as LC1 501, LC2, 502, LC3 503, and LC4 504, takes place in the supervisor module. The line cards comprise an ASIC 526. For ease of depiction, the ASIC 526 is only shown in LC1 510. The line-card front panel port traffic goes on an aggregated switch link interface (SLI) to the supervisor module for switching across or even for intra-line-card switching. An active supervisor module 510 and a standby supervisor module 515 comprise the supervisory (SUP) modules of the modular switch 500. A network interface (NIF) SLI backplane 530 provides for connections and interface between the line cards (e.g. LC1 501, LC2, 502, LC3 503, and LC4 504) and the supervisor modules 510 and 515.

In order to achieve persistency of data beyond the state and mode to the line cards (LC1 501, LC2, 502, LC3 503, and LC4 504), interfaces to the supervisor module 510 and 515 forwarding ASIC state also need to be maintained. Line card power needs to be maintained without interruption for persistent PoE and for data. Accordingly, and with reference to FIG. 5, the following is performed in order to invoke minimal operation of the reload handler:

Line card power is retained.

ASIC 526 state and PCIe (not depicted) interface is maintained from the supervisory active supervisor module 510 and a standby supervisor module 515.

An SLI link state is maintained.

The modular switch 500 maintains its port map as well as the active supervisor module 510 and a standby supervisor module 515 forwarding table state is maintained.

Based on port configuration the reload handler 123 of the modular switch 500 maintains the PHY and PoE connections to devices which are to be kept active.

Data forwarding for PoE devices is maintained.

Spanning tree and TCP keepalive is disabled.

No new link or PoE device may be added.

By way of a summary of the above discussion of FIG. 5, a first, dotted line 550 indicates "normal" path of data packets through the modular switch 500 and active supervisor module 510. A second, dashed line 560 indicates the path of data packets through the modular switch 500 and the active supervisor module 510 when reload handler 123 invokes minimal slow-path forwarding.

Figure 6:
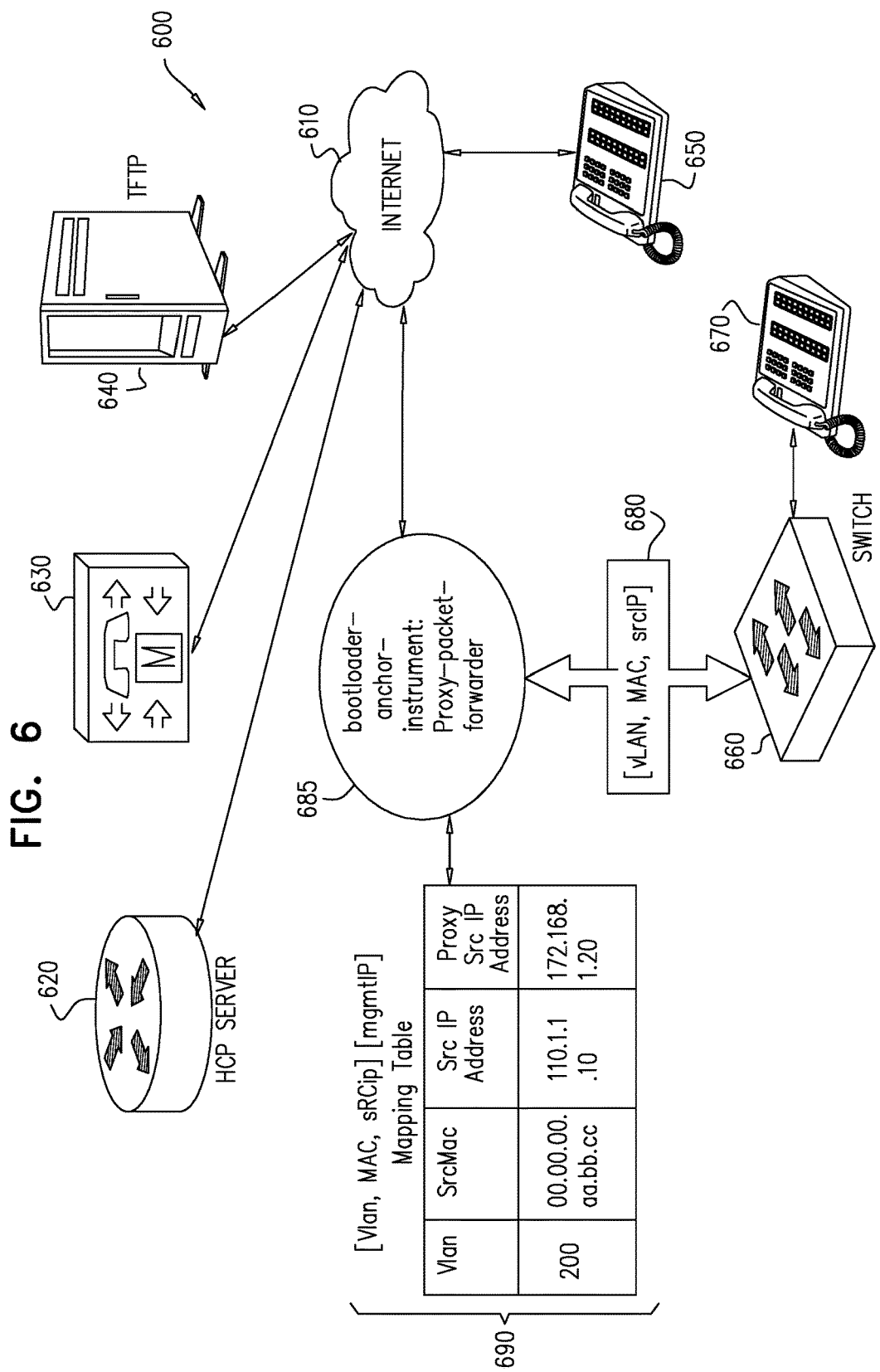
FIG. 6 is a block diagram illustration of a generalized embodiment, constructed and operative in accordance with an embodiment of the present disclosure.

Reference is now made to FIG. 6, which is a block diagram illustration 600 of a generalized embodiment, constructed and operative in accordance with an embodiment of the present disclosure. FIG. 6 depicts a high level discussion of slow path forwarding. Slow path is applicable for the above scenarios for the cases where the complete stack and/or supervisor modules in a switch is reloaded. Slow path reflects a worst case scenario when a host CPU management Ethernet interface (e.g., MGMT port 335 of FIG. 3, to give just one example) is the only available path to reach the Internet for IP media data or control packet routing.

A software agent 685 runs in the bootloader or ROMmon for handling packets to provide a default route to Internet. The software agent needs to modify the source (src) IP address of the packets coming from End-Device (for example, IP telephones 650 and 670) to make itself an anchor for the return path. A mapping of <srcIP, MAC, vlan-id> (i.e.: IP address of the source device of the packets; MAC address of the source device of the packets; and the virtual LAN ID) for downstream packets flowing to their destination will be needed by the software agent in order to route the packets to an appropriate device on the access port of switch 660. For example, a packet from IP telephone 650 which is routed to IP telephone 670 will pass through switch 660, and need to exit switch 660 via the access port of switch 660 which routes the packet to IP telephone 670. At the time of the reload, an entry will be made in the ASIC forwarding tables to serve as a look up which will route to the desired ports. A packet handler will rewrite the packet before enqueuing the packet in the outgoing management port driver queue.

Turning specifically to FIG. 6, various devices are communicating in a typical fashion via the Internet 610. For example, the devices may include a High-performance Computing (HCP) server 620, a call manager 630 for IP telephony, a file server, such as a T-FTP (trivial File Transfer Protocol) server 640, and an IP telephone 650. It is appreciated that these devices are mentioned by way of example only, and many other devices might be in communication. It is also appreciated that "the Internet" 610 is used in an informal fashion, and various types of networks might be involved, said networks comprising servers, routers, switches, and so forth, as is known in the art.

A switch 660 is in communication with IP telephone 670. Upon a crash, the switch 660 enters the bootloader or ROMmon. The switch 660 will invoke slow path forwarding in accordance with the various embodiments enumerated above. As described above, the switch 660 will, at a minimum map <srcIP, MAC, vlan-id>, i.e. the path to forward packets from a source device, such as IP telephone 650, to a destination device, such as IP telephone 670. This mapping is made available to a software agent 685, as described above. The software agent 685 will store this information in a table 690 for relevant devices (such as IP telephone 670).

Figure 7:
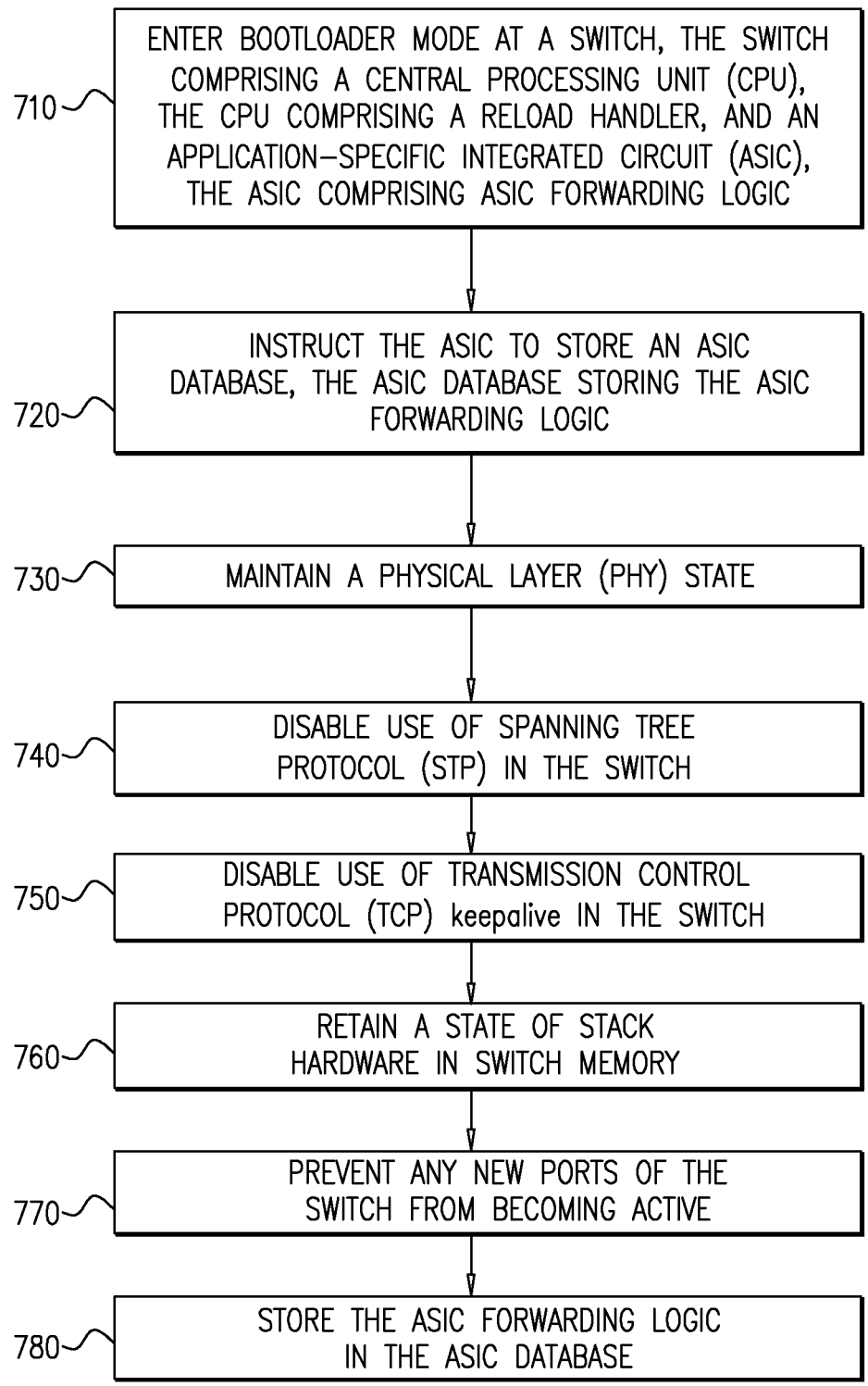
FIG. 7 is a flow chart of a method of operation for one embodiment of the present disclosure.

Reference is now made to FIG. 7, which is a flow chart of a method of operation for an embodiment of the present disclosure. At step 710, a switch enters bootloader mode. The switch comprises a CPU, such as, by way of example, CPU 122, the CPU comprising a reload handler (for example reload handler 123), and an ASIC, the ASI comprising ASIC forwarding logic.

The reload handler instructs the ASIC to store an ASIC database, the ASIC database storing the ASIC forwarding logic (step 720).

The PHY layer state of the switch is maintained by the reload handler (step 730). Use of STP is disabled by the switch (step 740), and the use of TCP keepalive is also disabled in the switch (step 750). At step 760, a hardware state of stack hardware and software comprised in the switch is maintained.

New ports are prevented from becoming active in the switch (step 770). At step 780, the ASIC forwarding logic, in response to the instruction of the reload handler, is stored in the ASIC database by the ASIC.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A system comprising:
a central processing unit (CPU) comprised in a switch, the CPU comprising a reload handler; and
an application-specific integrated circuit (ASIC) in the switch, the ASIC comprising ASIC forwarding logic, upon the switch entering a bootloader mode, the reload handler:
maintains a physical layer (PHY) state;
instructs the ASIC to store a database comprising the ASIC forwarding logic;
disables spanning tree protocol (STP) in the switch;
disables use of Transmission Control Protocol (TCP) keepalive in the switch;
retains a state of stack hardware in switch memory; and
prevents any new ports of the switch from becoming active; and
the ASIC storing the ASIC forwarding logic in the database upon receipt of an instruction from the reload handler.

2. The system according to claim 1 wherein at least one device is connected to the switch at a downlink, and upon the switch entering bootloader mode, packets received from the device are forwarded by the switch to an uplink.

3. The system according to claim 2 wherein the at least one device comprises a power over Ethernet (PoE) device.

4. The system according to claim 1 wherein the switch comprises a standalone switch.

5. The system according to claim 4 wherein the reload handler adds a default entry to the ASIC database pointing to a management Ethernet port which is to be used for persistent data.

6. The system according to claim 1 wherein the switch comprises a stackable switch, and the switch is connected to a master switch at a stack interface.

7. The system according to claim 6, wherein, upon a complete stack reload, the reload handler adds an entry in the ASIC database so that a data-path defaults to a management Ethernet port of the management switch for failed look-ups in the ASIC forwarding logic.

8. The system according to claim 1 wherein the switch enters the bootloader mode upon receiving a reload or slot reload command.

9. The system according to claim 1 wherein the switch enters the bootloader mode due to a switch malfunction.

10. The system according to claim 1 wherein the reload handler creates a dynamic destination index upon the switch entering the bootloader mode.

11. The system according to claim 1 wherein the switch is adapted, upon entering the bootloader mode, to not provide power to a new power over Ethernet (PoE) device.

12. The system according to claim 1 wherein the switch, upon performance of a complete stack reload:
normally forwards Open Systems Interconnection (OSI) Layer 2 and Layer 3 packets to locations which were previously known; and
punts packets which cannot be switched to a next switching level.

13. A method comprising:
entering a bootloader mode at a switch, the switch comprising:
a central processing unit (CPU), the CPU comprising a reload handler; and
an application-specific integrated circuit (ASIC), the ASIC comprising ASIC forwarding logic;
instructing the ASIC to store an ASIC database, by the reload handler, the ASIC database storing the ASIC forwarding logic;
maintaining, by the reload handler, a physical layer (PHY) state;
disabling use of spanning tree protocol (STP) in the switch;
disabling use of Transmission Control Protocol (TCP) keepalive in the switch;
retaining a state of stack hardware in switch memory;
preventing any new ports of the switch from becoming active; and
storing the ASIC forwarding logic in the ASIC database, by the ASIC.

14. The method according to claim 13 and further comprising, upon the switch entering the bootloader mode, forwarding packets received from at least one device connected to the switch at a downlink, to an uplink.

15. The method according to claim 14 wherein the at least one device comprises a power over Ethernet (PoE) device.

16. The method according to claim 13 wherein the switch comprises a standalone switch.

17. The method according to claim 16 and further comprising the reload handler adding a default entry to the ASIC database pointing to a management Ethernet port which is to be used for persistent data.

18. The method according to claim 13 wherein the switch comprises a stackable switch, and the switch is connected to a master switch at a stack interface.

19. The method according to claim 18 and further comprising the reload handler adding an entry in the ASIC database so that a data-path defaults to a management Ethernet port of a management switch for failed look-ups in the ASIC forwarding logic.

20. An apparatus comprising:
   means for entering a bootloader mode at a switch, the switch comprising;
   a central processing unit (CPU), the CPU comprising a reload handler; and
   an application-specific integrated circuit (ASIC), the ASIC comprising ASIC forwarding logic;
   means for instructing the ASIC to store an ASIC database, the ASIC database storing the ASIC forwarding logic;
   means for maintaining a physical layer (PHY) state;
   means for disabling use of spanning tree protocol (STP) in the switch;
   means for disabling use of Transmission Control Protocol (TCP) keepalive in the switch;
   means for retaining a state of stack hardware in switch memory;
   means for preventing any new ports of the switch from becoming active; and
   means for storing the ASIC forwarding logic in the ASIC database, by the ASIC.

* * * * *